US008846800B2

(12) United States Patent
Rexin et al.

(10) Patent No.: US 8,846,800 B2
(45) Date of Patent: *Sep. 30, 2014

(54) REINFORCED POLYAMIDE MOULDING MATERIALS

(75) Inventors: Ornulf Rexin, Domat/EMS (CH);
Jean-Jacques Linster, Chur (CH);
Manfred Hewel, Domat/EMS (CH)

(73) Assignee: EMS-Chemie AG, Domat/Ems (CH)

( * ) Notice: Subject to any disclaimer, the term of this patent is extended or adjusted under 35 U.S.C. 154(b) by 337 days.

This patent is subject to a terminal disclaimer.

(21) Appl. No.: 11/594,228

(22) Filed: Nov. 8, 2006

(65) Prior Publication Data

US 2007/0117910 A1    May 24, 2007

(30) Foreign Application Priority Data

Nov. 18, 2005   (EP) .................................... 05025215

(51) Int. Cl.
| C08G 69/26 | (2006.01) |
| C08G 69/02 | (2006.01) |
| C08G 69/32 | (2006.01) |
| C08L 77/10 | (2006.01) |
| C08L 77/00 | (2006.01) |
| C08L 77/06 | (2006.01) |
| C08L 77/02 | (2006.01) |
| C08K 7/14 | (2006.01) |

(52) U.S. Cl.
CPC .................. *C08L 77/06* (2013.01); *C08L 77/10* (2013.01); *C08K 7/14* (2013.01); *C08L 77/00* (2013.01); *C08L 77/02* (2013.01)
USPC ............... 524/494; 524/1; 524/297; 524/447; 524/449; 524/451; 524/496; 524/500; 524/606

(58) Field of Classification Search
USPC ............. 524/1, 297, 447, 449, 451, 494, 496, 524/500, 606
See application file for complete search history.

(56) References Cited

U.S. PATENT DOCUMENTS

| 4,225,701 A * | 9/1980 | Pfeifer et al. .................. 528/347 |
| 4,673,728 A * | 6/1987 | Nielinger et al. ............. 528/339 |
| 5,081,222 A * | 1/1992 | Reimann et al. ............. 528/324 |
| 5,283,282 A * | 2/1994 | Hamada et al. ............. 525/92 B |
| 6,291,633 B1 * | 9/2001 | Nakamura ...................... 528/310 |
| 2002/0173584 A1 * | 11/2002 | Ebert et al. ...................... 524/538 |
| 2007/0072970 A1 * | 3/2007 | Schneider ...................... 524/126 |
| 2007/0117910 A1 * | 5/2007 | Rexin et al. .................... 524/494 |

FOREIGN PATENT DOCUMENTS

| DE | 43 21 247 A1 | 1/1994 |
| EP | 0 544 049 B1 | 2/1993 |
| EP | 0 672 723 A1 | 9/1995 |
| JP | 58-120665 | 7/1983 |
| JP | 60-206861 | 3/1984 |
| JP | 1-168758 | 7/1989 |
| JP | 08229942 A * | 9/1996 | ............... F01P 11/00 |
| JP | 2001219437 A * | 8/2001 | ............... B29C 45/00 |
| JP | 2006-311763 | 11/2006 |
| TW | 95141411 | 11/2006 |
| WO | WO 99/16829 | 4/1999 |
| WO | 2005/035664 A1 | 4/2005 |
| WO | WO 2005/033192 A1 | 4/2005 |
| WO | WO 2005035664 A1 * | 4/2005 | ............... C08K 3/00 |

OTHER PUBLICATIONS

Miklos, M. and R. Gregory, Common mistakes in long-fiber molding. Jan. 2003. Plastics Technology 49(1) p. 40-41.*
Liguori, A.M. and A. Mele. (1954) Viscous Behavior of Polyhexamethyleneadipamide Molecules in Solution. Journal of Polymer Science, vol. XII (72), pp. 598-594.*
Machine Translation of JP 2001-219437.*
Machine Translation of JP 08-229942.*
Abstract of JP 08229942 A.*
Chung, Deborah D.L. (1994). Carbon Fiber Composites, Elsevier, p. 3-11.*
International Search Report issued in copending European Patent Publicaton No. EP 06 02 3733.
Examination report dated Jul. 31, 2012, issued by the Korean Intellectual Property Office in copending Korean Patent Application No. 10-2006-0112461.
Notice of Preliminary Rejection in corresponding Korean Patent Application No. 10-2006-0112461, issued Feb. 28, 2013 (with English translation).
English-language translation of pending claims for Taiwanese Patent Application No. 95141411 published Nov. 8, 2006 (6 pages).
English-language translation of Office Action dated Jul. 31, 2012, issued by the Taiwan Intellectual Property Office in copending Taiwanese Patent Application No. 95141411 (6 pages).
English-language translation of Search Report dated Nov. 16, 2012, for Taiwanese Patent Application No. 95141411 (1 page).
English-language translation of Notice of Reasons of Rejection (including 3 cited references) issued in JP 2006-311763, dated Apr. 16, 2012 (one page).

(Continued)

*Primary Examiner* — Ling Choi
*Assistant Examiner* — David L Miller
(74) *Attorney, Agent, or Firm* — Browdy and Neimark, PLLC

(57) ABSTRACT

The present invention relates to reinforced polyamide molding materials which can be prepared from a polyamide blend and, for example, by compounding with cut fibers or continuous filaments on twin-screw extruders and have mechanical properties which are usually not compatible with one another, namely a combination of exceptionally high rigidity and strength and at the same time good toughness. Furthermore, a high heat distortion temperature (HDT) is achieved according to the invention.

The thermoplastic polyamide molding materials according to the invention are suitable for the production of moldings or other semifinished products or finished articles, which can be produced, for example, by extrusion, injection molding, direct methods or direct compounding, in which the compounded polyamide molding material is processed directly by injection molding, or other deformation techniques.

7 Claims, No Drawings

(56) References Cited

OTHER PUBLICATIONS

English-language translation of Decision of Rejection issued in JP 2006-311763, dated Apr. 16, 2012 (one page).
English-language translation of Notice of Reasons of Refusal issued in JP 2006-311763, dated Nov. 22, 2001 (three pages).
English-language translation of 2nd Office Action, Chinese Patent Application 200610145211.X, 8 pages. (2010).
English-language translation of Final Rejection issued in Chinese Patent Application 200610145211.X, 15 pages (May 25, 2011).
English-language translation of Notice of Reexamination, Chinese Patent Application 200610145211.X, 10 pages (May 9, 2011).
TW 95141411 Office Action dated Nov. 20, 2012 (incl. Search Report and Pending Claims).
EP 1 788 026 European Search Report, one page (Dec. 21, 2005).
EP 1 788 029 European Search Report, one page (Feb. 2, 2007).
Office action issued by the Taiwanese Patent office on Apr. 24, 2014, for Taiwanese Patent Application No. 95141411 (Translated into English).

* cited by examiner

REINFORCED POLYAMIDE MOULDING MATERIALS

The present invention relates to reinforced polyamide moulding materials which can be prepared from a polyamide blend and, for example, by compounding with cut fibres or continuous filaments on twin-screw extruders and have mechanical properties which are usually not compatible with one another, namely a combination of exceptionally high rigidity and strength and at the same time good toughness. Furthermore, a high heat distortion temperature (HDT) is achieved according to the invention.

The thermoplastic polyamide moulding materials according to the invention are suitable for the production of mouldings and other semifinished products or finished articles, which can be produced, for example, by extrusion, injection moulding, pressing, direct processes or direct compounding, in which the compounded polyamide moulding material is processed directly by injection moulding, or other deformation techniques.

Reinforced polyamide blends are playing an increasing role in the area of technical construction materials since they exhibit good toughness and heat distortion temperature in addition to high rigidity. Fields of use are, for example, interior and exterior parts in the automotive sector and in the area of other means of transport, housing materials for devices and apparatuses for telecommunications, entertainment electronics, household appliances, mechanical engineering, heating sector and fixing parts for installations.

The particular advantage of reinforced polyamides lies in the exceptionally good bond between polymer matrix and reinforcing materials. This also applies in the case of high degrees of reinforcement which lead to very rigid products. However, the toughness of these products does not meet all requirements.

Below, polyamides are to be understood as meaning those polymers which are derived from dicarboxylic acids, diamines, aminocarboxylic acids and/or lactams. They may be homo- or copolyamides. The number average molecular weight of the polyamides should be above 5000, preferably above 10 000.

JP 07-097514 (Asahi) describes polyamide resin compositions as insulation material for electrical sliding switches. The property profile strived for includes the following properties: dimensional stability, HDT, creep resistance, arc resistance, surface roughness, surface gloss, deposits in the mould during shaping, frictional properties and flowability. Particular value is attached to the electrical properties, the surface quality and the frictional properties. The polyamide blend used as a matrix (40 to 70% by weight) is composed of (a1) a copolyamide of 55 to 95% by weight of 66 units and 5 to 45% by weight of 6I units and/or 6 units and (a2) 0 to 50% by weight of an aliphatic polyamide (PA) selected from PA6, PA66, PA11, PA12, PA610, PA612, PA46 and, as a filler (30 to 60% by weight), a mixture of fibres and minerals (weight ratio 1.0 or lower) selected from glass fibres, carbon fibres, mica, talc, kaolin, wollastonite, calcium carbonate, magnesium oxide or potassium titanate. In the examples, copolyamide 66/6I or copolyamide 66/6 is used as component (a1) and PA66, PA66/6, PA612 or PA6 is used as component (a2). The ultimate tensile strengths achieved in the examples are between 1070 kg/cm$^2$ and 1800 kg/cm$^2$, i.e. between 105 MPa and 176 MPa. The HDT A values achieved are between 210° C. and 241° C.

JP 03-269056 (Mitsubishi) describes very generally in the patent claims polyamide moulding materials comprising (A) polyamide 6 or polyamide 66 in combination with a copolyamide of (Ba) aliphatic diamine, isophthalic acid and terephthalic acid (60 to 100% of (Ba)) and (Bb) lactam and/or aliphatic diamine and aliphatic dicarboxylic acid (0 to 40% of (Bb)), filler (C) and, as component (D), saturated aliphatic carboxylic acids and/or a metal salt thereof. According to JP 03-269056, the conditions (A)+(B)=40 to 95%, (C)=3 to 60%, (D)=0.005 to 1% and a ratio of (B)/(A) of 0.01 to 0.025, where (B)=(Ba)+(Bb), are applicable for the ratios.

It is therefore an object of the present invention to provide further very rigid and at the same time tough, reinforced polyamide moulding materials having high heat distortion temperatures (HDT) so that a certain filler content results in mechanical properties which are usually not compatible with one another.

This object is achieved by the a fibre-reinforced polyamide blend comprising a polyamide matrix of a blend of polyamide 66 (homopolyamide) and a copolyamide (CoPA) 6T/66 (B) and, a reinforcing material, a mixture of glass fibres and carbon fibres. According to the invention, in order to obtain a further increase in the rigidity, a part of the glass fibres was replaced by carbon fibres so that a hybrid fibre-reinforced compound is used.

The object is furthermore achieved by the process for the preparation of moulding materials of such blends, by the long fibre-reinforced rod-shaped pellets formed, the use thereof, the production of the mouldings, and the mouldings resulting therefrom.

The polyamide moulding materials according to the invention are therefore very rigid and at the same time tough, reinforced polyamide moulding materials having high heat distortion temperature (HDT), containing, as polyamide matrix, a blend of the following components:

(A) polyamide 66,
  ($b_2$) 30 to 70 parts by weight of units, optionally 45 to 55 parts by weight of units, which are derived from adipic acid in combination with hexamethylenediamine in almost equimolar ratio,
  the parts by weight of the components ($b_1$) and ($b_2$) together giving 100 parts by weight,
  and containing, as filler component, a mixture of:
(C) glass fibres and
(D) carbon fibres,
  the percentages by weight of the components (A) to (D) together giving 100% and the components (A), (B), (C), and
(D) fulfilling the following conditions:
(A)+(B): 20 to 60% by weight,
weight ratio (A)/(B): 50/50 to 95/5,
(C)+(D): 40 to 80% by weight,
weight ratio (C)/(D): 80/20 to 95/5,
  the polyamide moulding materials optionally containing additives (E) in addition to the components (A) to (D), and the amount thereof being additive to the sum of the components (A) to (D).

In particular embodiments of the invention, the amount of filler, i.e. of glass fibres and carbon fibres, is 45 to 80% by weight, particularly preferably 48 to 75% by weight, very particularly preferably 64 to 75% by weight, especially preferably 66 to 74% by weight.

The properties of the reinforced moulding materials which are achieved according to the invention comprise ultimate tensile strengths of more than 230 MPa (measured on standard test specimens according to ISO 527), elongations at break of more than 1.4% (measured on standard test specimens according to ISO 527), heat distortion temperature values HDT/A (1.8 MPa) (measured according to ISO 75) of more than 242° C., preferably of at least 245° C., HDT/C (8

MPa) (measured according to ISO 75) of more than 165° C., preferably of more than 190° C.

The copolyamide used according to the invention is a copolyamide 6T/66 (component (B)). The ratio of polyamide 6T/66 to the proportion of polyamide 66 is of particular importance.

By setting the ratio 6T>66, the melting point and the HDT can be raised. The copolyamide 6T/66 has a relative viscosity (RV), measured in 0.5% m-cresol solution, of between 1.5 and 1.9, preferably of between 1.6 and 1.75.

The glass fibres used according to the invention as filler component (C) have a diameter of 5 to 20 µm, preferably of 5 to 10 µm, the cross-section of the glass fibres being round, oval or polygonal. In particular, E-glass fibres are used according to the invention. However, it is also possible to use all other glass fibre types, such as, for example, A-, C-, D-, M-, S- or R-glass fibres or any desired mixtures thereof or mixtures with E-glass fibres.

The moulding materials according to the invention can, however, also contain further additives (E), such as, for example, from the group consisting of inorganic stabilizers, organic stabilizers, lubricants, dyes, metallic pigments, metal spangles, metal-coated particles, halogen-containing flameproofing agents, halogen-free flameproofing agents, impact modifiers, antistatic agents, conductivity additives, demoulding agents, optical brighteners, natural sheet silicates, synthetic sheet silicates or mixtures of said additives.

Antistatic agents which may be used in the moulding materials according to the invention are, for example, carbon black and/or carbon nanotubes.

The use of carbon black in addition to the carbon fibres present can, however, also serve for improving the blackness of the moulding material.

Sheet silicates which may be used in the moulding materials according to the invention are, for example, kaolins, serpentines, talc, mica, vermiculites, illites, smectites, montmorillonite, hectorite, double hydroxides or mixtures thereof. The sheet silicates may have been surface-treated or may be untreated.

Stabilizers or antiaging agents which may be used in the moulding materials according to the invention are, for example, antioxidants, antiozonants, light stabilizers, UV stabilizers, UV absorbers or UV blockers.

The present invention therefore relates to a fibre-reinforced polyamide blend having mechanical properties which are usually not compatible with one another, namely a combination of exceptionally high rigidity and high HDT and at the same time good toughness. Surprisingly, it has been found that this can be achieved by the combination of two measures: the addition of a partly aromatic copolyamide 6T/66 and the use of carbon fibres in addition to glass fibres. Thus, a hybrid fibre-reinforced compound is used, a content of 15 to 30% by weight of PA66, 4 to 17% by weight of CoPA 6T/66, 61 to 65% by weight of glass fibres and 5 to 9% by weight of carbon fibres having been found to be a particularly preferred composition for the moulding material according to the invention, with regard to both mechanical properties and cost-efficiency. The percentages by weight sum to 100%. The amount of any additives is in addition to this 100%.

In an embodiment of the invention with a total fibre content of 66 to 74% by weight, the moulding materials exhibit a tensile modulus of elasticity of more than 25 500 MPa, preferably of more than 27 000 MPa, particularly preferably of more than 28 000 MPa, and in particular an elongation at break of at least 1.5%.

The elongation at break of the moulding materials according to the invention having a total fibre content of 66 to 74% by weight may be preferably at least 1.7%, particularly preferably at least 1.8%.

In another embodiment of the invention, the moulding materials according to the invention having a filler content (total fibre content) of 46 to 54% by weight have a tensile modulus of elasticity of more than 18 000 MPa, preferably of more than 19 000 MPa, particularly preferably of more than 20 000 MPa, and in particular an elongation at break of at least 2.0%.

Particularly preferably, the elongation at break of the moulding materials according to the invention having a total fibre content of 46 to 54% by weight is at least 2.3%, very particularly preferably at least 2.5%.

The values of the tensile modulus of elasticity are greatly dependent on the total fibre content, the glass fibre/carbon fibre mixing ratio and the mixing ratio of the two polyamides PA66 and PA6T/66.

Particularly highly reinforced compounds are usually very brittle and not suitable for practical use. Surprisingly, it has been found that there are possible blend combinations which impart exceptionally good toughness, i.e. elongation at break, to the compound in spite of high fibre content, very high rigidity and high HDT.

It has been found according to the invention that in particular a mixture of an aliphatic PA 66 having a relative viscosity between 2.3 and 2.7 (measured in $H_2SO_4$, 1%) and a partly aromatic CoPA 6T/66 in the ratio 55:45 has a particularly preferred combination of extremely high rigidity, good toughness and high HDT. Finally, according to the invention, a product having even more metal-like properties than glass fibre-reinforced materials to date is disclosed.

An even higher toughness and hence an even more metal-like property can be achieved with the use of especially thin glass fibres having a diameter of less than 10 µm.

In long fibre-reinforced moulding materials higher toughnesses result and thus even more metal-like properties, if instead of the common endless glass fibre with a diameter of 15 to 19 µm such with a diameter of 10 to 14 µm, preferably such with a diameter of 10 to 12 µm are used.

The preparation of the polyamide moulding materials according to the invention can be effected on customary compounding machines, such as, for example, single-screw or twin-screw extruders or screw kneaders. As a rule, the polymeric fraction is first melted and the reinforcing material (glass fibres and carbon fibres) can be introduced at the same point or at different points of the extruder, for example by means of a side feeder. The compounding is preferably effected at set barrel temperatures of 280° C. to 320° C. The polymeric fraction and the reinforcing material can, however, also be metered together into the feed.

The polyamide moulding materials according to the invention can furthermore be prepared by the known methods for manufacturing long fibre-reinforced rod-shaped pellets, especially by pultrusion processes in which the roving is completely impregnated with the polymer melt and then cooled and cut. The long fibre-reinforced rod-shaped pellets, which preferably show a granulate length of 4 to 25 mm, especially of 5 to 12 mm, obtained in this manner can be further processed by the customary processing methods (such as injection moulding, pressing) to give shaped articles, in which especially fine properties of the shaped article are obtained by mild processing methods. In this context mild means mainly that an excessive fibre fracture and the strong reduction of the fibre length associated with it is largely avoided. For the injection moulding this means that screws with large diameter and low compression ratio, especially below 2, and nozzle and Angus ducts dimensioned on a grand scale are preferably used.

Additional it has to made sure that the rod-shaped pellets flux on quickly (contact heating) via high cylinder temperatures and the fibres are not to much hackled due to excessive shear stress. Bearing in mind these measures, shaped articles are obtained according to the invention, which show in average a larger fibre length than comparable shaped articles made from short fibre-reinforced moulding materials. Through this, an additional improvement of the properties, especially tensile modulus of elasticity, the ultimate tensile strength and the notch impact toughness is obtained.

The polymer extrudate produced from moulding materials according to the invention can be processed by all known pelletizing methods to give pellets, such as, for example, by pelletizing in which the extrudate is cooled in a water bath and then cut. From a fibre content of more than 60% by weight, the use of underwater pelletizing or hot face cutting under water, in which the polymer melt is forced directly through a die and pelletized by a rotating knife in a water stream, is advisable for improving the pellet quality.

A further possibility for the preparation of the moulding materials according to the invention is the mixing of pellets with, for example, different matrices and/or fillers to give a dry blend which is subsequently further processed. For example, in each case a compound in pellet form can first be prepared from the components (A) and/or (B) and the fillers (C) and/or (D) and optionally the additive (E), and these pellets can then be mixed to give a dry blend, optionally with addition of even further amounts of component (A) and/or (B) in pellet form. The dry blend prepared in this manner is then further processed.

The homogenized pellet mixture (dry blend) is processed in a processing machine, for example a screw injection moulding machine, to give hybrid fibre-reinforced mouldings and/or hollow bodies, it being possible to add further amounts of component (A) and/or (B) in pellet form.

With the processing of a dry blend, better mechanical properties tend to be achieved. However, the mixing of the dry blend gives rise to an additional production step which increases the production costs and hence adversely affects the cost-efficiency. Moreover, vibrations during transport may result in separation, caused by the difference between the densities of the various types of pellets.

The mouldings produced from the moulding materials according to the invention are used for the production of interior and exterior parts, preferably having a supporting or mechanical function, in the electrical, furniture, sport, mechanical engineering, sanitary and hygiene areas, medicine, energy and drive technology, in the automotive sector and the sector relating to other means of transport, or housing material for devices and apparatuses for telecommunication, entertainment electronics, household appliances, mechanical engineering, the heating sector or fixing parts for installations or for containers and ventilation parts of all types.

In particular the area of metal die casting replacement in which extremely high rigidity in combination with good toughness is expected may be mentioned as possible applications for the mouldings produced from the moulding materials according to the invention.

Processing Methods

In addition to the customary processing methods, such as extrusion or injection moulding, the following processing methods are also suitable:

Coinjection/biinjection or assembly injection moulding for hybrid parts in which the polyamide moulding material according to the invention is combined with other compatible or incompatible materials, such as, for example, thermoplastics, thermosetting plastics or elastomers.

Insert parts, such as, for example, bearing parts or thread inserts comprising the polyamide moulding material according to the invention, coated with other compatible or incompatible materials, such as, for example, thermoplastics, thermosetting plastics or elastomers.

Outsert parts, such as frames, housings or supports comprising the polyamide moulding material according to the invention into which functional elements comprising other compatible or incompatible materials, such as, for example, thermoplastics, thermosetting plastics or elastomers, are injected.

Hybrid parts (elements comprising the polyamide moulding material according to the invention in combination with other compatible or incompatible materials, such as, for example, thermoplastics, thermosetting plastics or elastomers), produced by sandwich injection moulding, injection welding, assembly injection moulding, ultrasonic, friction or laser welding, adhesive bonding, flanging or riveting.

Semifinished products and profiles (for example produced by extrusion, pultrusion, arrangement in layers or lamination).

Surface coating, lamination, chemical or physical metallization, flocking, it being possible for the polyamide moulding material according to the invention to be the substrate itself or the substrate support or, in the case of hybrid/biinjection parts, a defined substrate region, which can also be brought to the surface by subsequent chemical (e.g. etching) or physical treatment (for example cutting or laser ablation).

Printing, transfer printing, 3-D printing, laser inscription.
Applications
Electrical Appliance Sector Stop and/or adjusting elements for electrical hand tools with or without integrated electrical functions (moulded interconnect devices, MID)

connecting rods and/or pistons for hammer drills in homogenous design, i.e. comprising one material, or as a hybrid part, i.e. comprising a combination of materials housings, gear housings for right angle grinders, drills, electric planes or grinding machines with or without integrated electrical functions (MID) in homogeneous design or as a hybrid part, it being possible for certain functional areas (e.g. force transmission surfaces, sliding surfaces, decorative layer areas, grip region) to comprise another compatible or incompatible material (e.g. for targeted delamination or deformation, predetermined breaking point, force or torque limitation)

tool holders, e.g. chucks or fixing means sewing machine housings, sliding tables with or without integrated electrical functions (MID)
Sanitary and Hygiene Sector Housings and/or functional elements (e.g. for pumps, gears, valves) for oral irrigators, toothbrushes, comfort toilets, shower cabinets, hygiene centres with or without integrated electrical functions (MID) in homogeneous design or as a hybrid part
Household Appliance Sector Housings and/or functional elements for mechanical, electrical or electromechanical closing systems, locking systems or sensors with or without integrated electrical functions (MID) for refrigerators, chest refrigerators, chest freezers
ovens, cookers, steam cookers
dishwashing machines Automotive Sector Housings and/or holders with or without integrated electrical functions (MID) in homogenous design or as a hybrid part for controls/switches (e.g. for exterior mirror adjustment, seat position adjustment, lighting, driving direction indicator)

interior sensors, e.g. for seat occupation exterior sensors (e.g. for parking aids, ultrasonic or radar distance meters)

sensors in the engine space (e.g. vibration or knocking sensors)

interior and exterior lights motors and/or drive elements in the interior and exterior area (e.g. for seat comfort functions, exterior mirror adjustment, headlight adjustment and/or tracking, curve light)

monitoring and/or control systems for vehicle drive (e.g. for media transport and/or regulation of, for example, fuel, air, coolant, lubricant)

mechanical functional elements and/or sensor housings with or without integrated electrical functions (MID) for closing systems, locks, pull-to systems, e.g. in the case of vehicle swivel doors, sliding doors, engine space flaps or hoods, tailgates, vehicle windows Mechanical Engineering ISO standard parts and/or machine elements (e.g. screws, nuts, bolts, wedges, shafts, gear wheels) in standard dimensions or application-specific design or homogenous design ISO standard parts and/or machine elements, such as, for example, screws, nuts, bolts, wedges, shafts in standard dimensions or application-specific design or as a hybrid part, it being possible for certain functional regions, such as, for example, force transmission surfaces, sliding surfaces, decorative layer areas, to comprise another compatible or incompatible material (for example for targeted delamination, predetermined breaking point, force/torque limitation)

supports, stands, plinths for processing machines, such as, for example, upright drilling machines, table drilling machines, cutting machines or combination machines for metal and/or wood processing insert parts, e.g. threaded bushes self-tapping screws Energy and Drive Technology Sector:

frames, housings, support parts (substrate) and/or fixing elements for solar cells with or without integrated electrical functions (MID) in homogeneous design or as a hybrid part tracking and/or adjusting elements (e.g. for bearings, hinges, joints, drawbars, bumpers) for collectors.

pump housings and/or valve housings with or without integrated electrical functions (MID) in homogenous design or as a hybrid part.

Medical Equipment Sector frames, housings, support parts with or without integrated electrical functions (MID) in homogeneous design or as a hybrid part for monitoring devices and/or equipment for supporting vital functions disposable instruments, such as, for example, scissors, clamps, forceps, knife handles in homogeneous design or as a hybrid part constructions for short-term or emergency fixing of fractures in homogeneous design or as a hybrid part walking aids with or without integrated electrical functions (MID) and/or sensors for load monitoring in homogeneous design or as a hybrid part.

Sanitary Sector pump housings, valve housings or water meter housings with or without integrated electrical functions (MID) in homogeneous design or as a hybrid part.

The following examples are intended to explain the invention but without limiting it.

EXAMPLES

The materials used in the examples and comparative examples are characterized in table 1.

TABLE 1

| Material | Trade Name | Relative viscosity 20° C. m-cresol, 0.5% | Composition % by weight | Manufacturer |
|---|---|---|---|---|
| PA66 | Radipol A45 | 2.7 in $H_2SO_4$, 1% | — | Radici Chimica, Italy |
| PA6T/66 | XE 3774 NK | 1.72 | 55/45 | EMS-CHEMIE AG, Switzerland |
| GF | Vetrotex EC10-4.5MM 99B | — | — | Saint-Gobain Vetrotex, France |
| CF | Tenax HTA 5N51 6MM | — | — | Toho Tenax Europe GmbH, Germany |
| PA6I/6T | GRIVORY G21 | 1.52 | 2/1 | EMS-CHEMIE AG, Switzerland |
| PA6 | GRILON A23 | 2.47 in $H_2SO_4$, 1% | — | EMS-CHEMIE AG, Switzerland |

GF Glass fibre

CF Carbon fibre

The moulding materials having the compositions in Table 2 are prepared on a ZSK 25 type twin-screw extruder from Werner and Pfleiderer. The PA66 and PA6T/66 pellets are metered into the feed zone. The glass fibre, like the carbon fibre, is metered into the polymer melt via a side feeder 3 barrel units before the die.

The barrel temperature was set as an ascending profile up to 310° C. At 150 to 200 rpm, a 10 kg throughput was used. After the extrudates had been cooled in a water bath and following pelletizing and drying at 120° C. for 24 h, the pellet properties were measured.

The test specimens were produced on an Arburg injection moulding unit, the cylinder temperatures of 310° C. to 320° C. and a circumferential screw velocity of 15 m/min being set. The mould temperature was chosen as 110° C.

The mechanical properties, tensile modulus of elasticity, ultimate tensile strength and elongation at break, were determined by a tensile test on standard test specimens according to ISO 527. The measurement of the impact strength (IS) was carried out according to Charpy at 23° C. based on ISO 179/2-1eU.

The determination of the HDT/A (1.8 MPa) and HDT/C (8 MPa) was carried out according to ISO 75.

TABLE 2

| Property | Examples No. | | |
|---|---|---|---|
| | 1 | 2 | 3 |
| PA66 % by wt. | 33 | 26 | 22.7 |
| PA6T/66 % by wt. | 17 | 8.5 | 7.3 |
| Glass fibre % by wt. | 42 | 57.5 | 62 |
| Carbon fibre % by wt. | 8 | 8 | 8 |
| Tensile modulus of elasticity MPa | 20000 | 24500 | 28500 |
| Ultimate tensile strength MPa | 250 | 235 | 245 |
| Elongation at break % | 2.5 | 2.0 | 1.8 |
| HDT A ° C. | 245 | 250 | 255 |
| HDT C ° C. | 200 | 215 | 215 |

TABLE 3

| Property | Comparative examples No. | | | |
|---|---|---|---|---|
| | 4 | 5 | 6 | 7 |
| PA66 % by wt. | 37 | 28 | | 23 |
| PA6 % by wt. | | | 35 | |
| PA6I/6T % by wt. | 12 | 10 | | 7 |
| Glass fibre % by wt. | 50 | 60 | 65 | 70 |
| Tensile modulus of elasticity MPa | 17000 | 20000 | 22600 | 24500 |
| Ultimate tensile strength MPa | 250 | 250 | 210 | 240 |
| Elongation at break % | 2.5 | 2.2 | 1.6 | 1.5 |
| Charpy New impact 23° C. kJ/m² | 90 | 70 | 45 | 60 |
| Charpy New notch impact 23° C. kJ/m² | 12 | 14 | 12 | 10 |
| HDT A ° C. | 235 | 235 | 210 | 240 |
| HDT C ° C. | 165 | 175 | 180 | 190 |

The moulding materials of examples 1 to 3 according to the invention show a more balanced property profile compared with the moulding materials of comparative examples 4 to 7 with a corresponding filler content, i.e. a more balanced combination of high tensile modulus of elasticity and high HDT with simultaneously good elongation at break.

In spite of the slightly lower total fibre content, the moulding material of example 2 according to the invention shows the higher tensile modulus of elasticity, the higher ultimate tensile strength and the substantially higher HDT values compared with comparative example 6.

At a total fibre content of 70% by weight, example 3 shows better, i.e. higher, values than the moulding materials of comparative example 7 in all measured values.

Particularly good mechanical properties are obtained on using especially thin glass fibres having a diameter of less than 10 µm. In this way, it is possible to increase in particular the toughness of the material by up to 15%.

TABLE 4

| Property | Examples No. | | |
|---|---|---|---|
| | 1 | 2 | 3 |
| PA66 % by wt. | 37.5 | 26.25 | 22.5 |
| PA6T/66 % by wt. | 12.5 | 8.75 | 7.5 |

TABLE 4-continued

| Property | Examples No. | | |
|---|---|---|---|
| | 1 | 2 | 3 |
| Glass fibre % by wt. | 43 | 56 | 60 |
| Carbon fibre % by wt. | 7 | 9 | 10 |
| Tensile modulus of elasticity MPa | 20500 | 30900 | 33200 |
| Ultimate tensile strength MPa | 290 | 280 | 255 |
| Elongation at break % | 1.9 | 1.5 | 1.5 |
| Charpy New impact 23° C. kJ/m² | 80 | 85 | 85 |
| Charpy New notch impact 23° C. kJ/m² | 30 | 50 | 45 |

The examples quoted in table 4 are manufactured by the pultrusion method. The pultrusion conditions are listed in the following table:

| temperature setting extruder and impregnating chamber | ° C. | 280–370 |
|---|---|---|
| turnover pellets | kg/h | 100–180 |
| take-off velocity | m/min | 5–11 |
| fibre preheating | ° C. | none |
| pellet lenght | mm | 11 |

The test specimens manufactured from the long fibre-reinforced rod-shaped pellets (granulate length 11 mm) show with appropriate fibre content still more improvements concerning the tensile modulus of elasticity, the ultimate tensile strength, the notch impact toughness compared to the comparative variants. For the impact toughness equal or higher values are obtained.

The measurement of the notch impact toughness has been performed according to Charpy at 23° C. as per ISO 179/2-1eA.

The glass fibres used in the pultrusion method as roving, show a diameter of 10 to 20 µm, preferred 12 to 18 µm, in which the cross section of the glass fibres is round, oval or angled. Especially, according to the invention, E glass fibres are used. However, all other kinds of glass fibres, such as A, C, D, M, S, R glass fibres or any compositions thereof or compositions with E glass fibres can be applied. The endless carbon fibres used in the pultrusion method show a diameter of 5 to 10 µm, preferably 6 to 8 µm.

To speed up the fibre impregnation, the fibres can be preheated to temperatures up to 400° C. via a convenient IR-, contact-, radiation- or hot gas-preheating. Apparatuses with spreading surfaces inside the impregnating chamber provide a complete impregnation of the fibres with the polymer melt. Strands, leaving the impregnating device can be formed by controlled cylinder systems, so that pellets with round, elliptic or rectangular cross section are obtained.

To improve the matrix connection and the fibre handling, the fibres can be coated with chemical different layers, as they are known for glass and carbon fibres in the state of the art.

For the examples 17 to 20 the glass fibre PPG 4588 with 17 µm diameter from the firm PPG Industries Fibre Glass has been used.

As carbon fibre in the examples 8 to 10 Tenax HTA 5131 with 7 µm diameter from the firm Toho Tenax Europe GmbH in form of a roving has been used.

The invention claimed is:
1. Very rigid and simultaneously tough, reinforced polyamide moulding material, with heat distortion temperature values HDT/A (1.8 MPa) (measured according to ISO 75) of more than 242° C., and with a polyamide matrix containing a blend of the following components:

(A) polyamide 66,
(B) copolyamide, composed of
(b1) 70 to 30 parts by weight of units, which are derived from terephthalic acid (T) in combination with hexamethylenediamine (6),
(b2) 30 to 70 parts by weight of units, which are derived from adipic acid in combination with hexamethylenediamine, the parts by weight of the components (31) and (b2) together giving 100 parts by weight,
and a filler component containing a mixture of:
(C) glass fibres and
(D) carbon fibres,
the percentages by weight of the components (A) to (D) together giving 100% and the components (A), (B), (C), and (D) fulfilling the following conditions:
(A)+(B): 20 to 60% by weight,
weight ratio (A)/(B): 50/50 to 95/5,
(C)+(D): 66 to 74% by weight,
weight ratio (C)/(D): 80/20 to 95/5,
wherein the polymeric components of said reinforced polyamide moulding material comprises predominantly or entirely components (A) and (B), and the moulding material has a tensile modulus of elasticity of more than 25,500 Mpa.

2. Very rigid and simultaneously tough, reinforced polyamide moulding material, with heat distortion temperature values HDT/A (1.8 MPa) (measured according to ISO 75) of more than 242° C., and with a polyamide matrix containing a blend of the following components:
(A) polyamide 66,
(B) copolyamide, composed of
(b1) 70 to 30 parts by weight of units, which are derived from terephthalic acid (T) in combination with hexamethylenediamine (6),
(b2) 30 to 70 parts by weight of units, which are derived from adipic acid in combination with hexamethylenediamine,
the parts by weight of the components (b1) and (b2) together giving 100 parts by weight,
and a filler component containing a mixture of:
(C) glass fibres and
(D) carbon fibres,
the percentages by weight of the components (A) to (D) together giving 100% and the components (A) and (B) giving the following conditions:
(A)+(B): 20 to 60% by weight,
weight ratio (A)/(B): 50/50 to 95/5,
wherein the polymeric components of said reinforced polyamide moulding material comprises predominantly or entirely components (A) and (B);
characterized by a total fibre content of 66 to 74% by weight and an elongation at break of at least 1.7%.

3. Polyamide moulding material containing, as polyamide matrix, a blend of the following components:
(A) polyamide 66,
(B) copolyamide, composed of
(b1) 70 to 30 parts by weight of units, which are derived from terephthalic acid (T) in combination with hexamethylenediamine (6),
(b2) 30 to 70 parts by weight of units, which are derived from adipic acid in combination with hexamethylenediamine,
the parts by weight of the components (b1) and (b2) together giving 100 parts by weight,
and a filler component containing a mixture of:
(C) glass fibres and
(D) carbon fibres,
the percentages by weight of the components (A) to (D) together giving 100% and the components (A), (B), (C), and (D) fulfilling the following conditions:
(A)+(B): 20 to 55% by weight,
weight ratio (A)/(B): 50/50 to 95/5,
weight ratio (C)/(D) 80/20 to 95/5; and
wherein (C)+(D): 61 to 75% by weight.

4. The molding material of claim 3 wherein (C)+(D): 64 to 75% by weight.

5. The molding material of claim 1 wherein said tensile modulus of elasticity is more than 28,000 MPa.

6. The polyamide molding material of claim 1 wherein the tensile modulus of elasticity is more than 27000 MPa, and having an elongation at break of at least 1.5%.

7. The polyamide molding material of claim 2 having an elongation at break of at least 1.8%.

* * * * *